(12) United States Patent
Hazlewood et al.

(10) Patent No.: US 8,285,754 B2
(45) Date of Patent: Oct. 9, 2012

(54) PRESERVING REFERENCES TO DELETED DIRECTORY ENTRIES

(75) Inventors: Kristin Marie Hazlewood, Austin, TX (US); Daw Feng, Austin, TX (US); John Mark McConaughy, Austin, TX (US); Gary Dale Williams, Driftwood, TX (US); Shevaun-Ann Michelle Fontenot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 12/428,094

(22) Filed: Apr. 22, 2009

(65) Prior Publication Data

US 2010/0275059 A1    Oct. 28, 2010

(51) Int. Cl.
*G06F 17/30* (2006.01)
*G06F 7/00* (2006.01)

(52) U.S. Cl. ....................................... 707/802
(58) Field of Classification Search .............. 707/802
See application file for complete search history.

(56) References Cited

U.S. PATENT DOCUMENTS

| | | | |
|---|---|---|---|
| 6,119,122 A | 9/2000 | Bunnell | |
| 6,496,944 B1 | 12/2002 | Hsiao et al. | |
| 6,654,891 B1 | 11/2003 | Borsato et al. | |
| 7,251,749 B1 | 7/2007 | Fong et al. | |
| 2001/0047347 A1* | 11/2001 | Perell et al. ........................ | 707/1 |
| 2002/0032775 A1 | 3/2002 | Venkataramaiah et al. | |
| 2003/0088615 A1 | 5/2003 | Good et al. | |
| 2003/0163449 A1 | 8/2003 | Iwano et al. | |
| 2004/0268229 A1* | 12/2004 | Paoli et al. ..................... | 715/508 |
| 2005/0027823 A1* | 2/2005 | Rana ............................. | 709/219 |
| 2005/0278385 A1 | 12/2005 | Sutela et al. | |
| 2006/0015527 A1 | 1/2006 | Dingle | |
| 2006/0230121 A1 | 10/2006 | Arndt et al. | |
| 2006/0259587 A1 | 11/2006 | Ackerman et al. | |
| 2008/0033966 A1 | 2/2008 | Wahl | |
| 2008/0228693 A1 | 9/2008 | Esser et al. | |
| 2008/0247281 A1 | 10/2008 | Maeda et al. | |
| 2008/0256139 A1 | 10/2008 | Jessee | |
| 2009/0006860 A1* | 1/2009 | Ross ............................. | 713/189 |

* cited by examiner

*Primary Examiner* — Kuen Lu
(74) *Attorney, Agent, or Firm* — Garg Law Firm, PLLC; Rakesh Garg; Jeffrey S. LaBaw

(57) ABSTRACT

A method, system, and computer usable program product for preserving references to deleted directory entries are provided in the illustrative embodiments. An instruction to delete an entry is received. A second entry referencing the entry is identified. The second entry is marked as a ghost reference to the entry. The entry is converted to a deleted entry. A ghost attribute with a value of "false" may be added to the entry. A ghost attribute or tag with a value of "false" may be added to the second entry. The ghost tag may correspond to an attribute of the second entry that references the entry. An entry may be deleted by setting a value of a ghost attribute in the entry to true. The second entry may be marked as the ghost reference by setting a value of a ghost attribute or a ghost tag in the second entry to true.

20 Claims, 5 Drawing Sheets

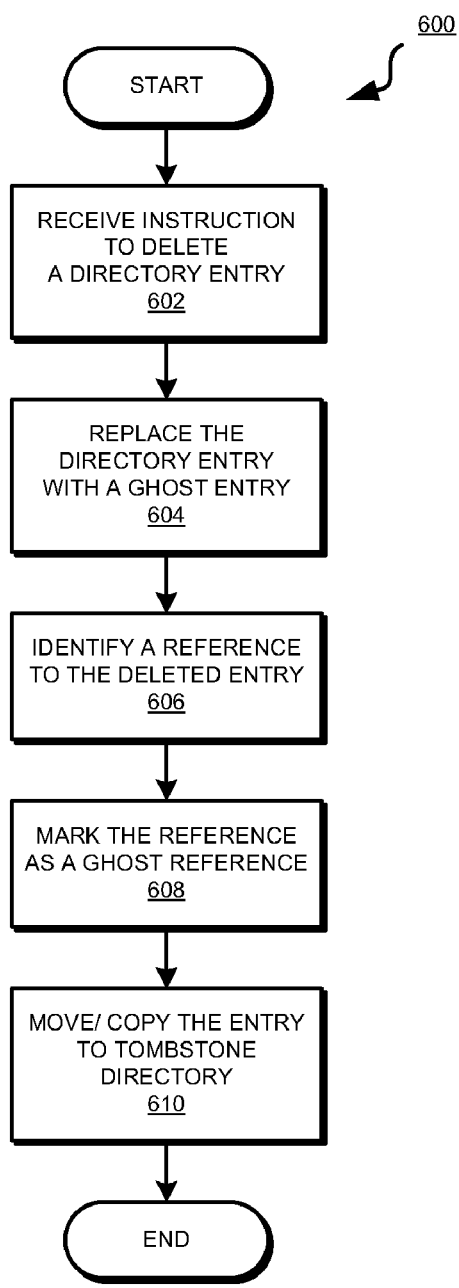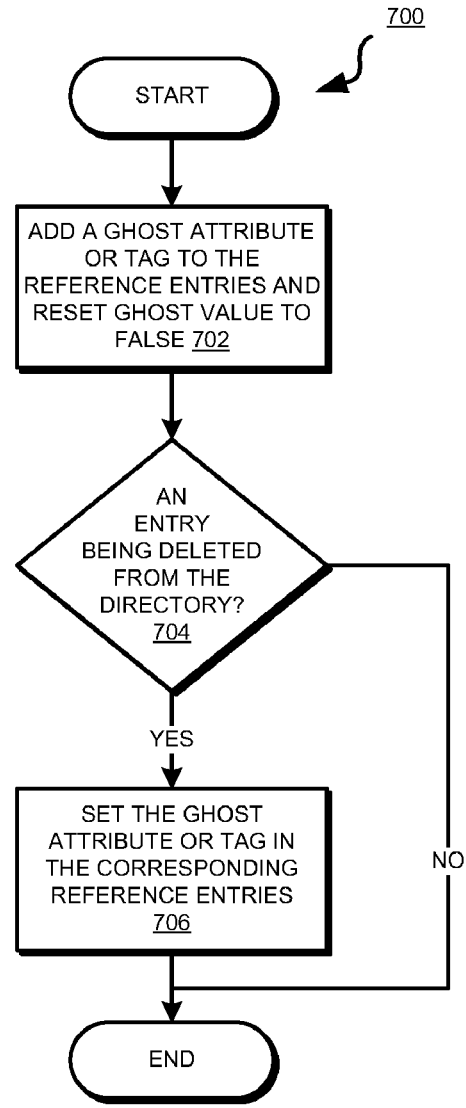

PRESERVING REFERENCES TO DELETED DIRECTORY ENTRIES

BACKGROUND OF THE INVENTION

1. Field of the Invention

The present invention relates generally to an improved data processing system, and in particular, to a computer implemented method for managing directories. Still more particularly, the present invention relates to a computer implemented method, system, and computer usable program code for preserving references to deleted directory entries.

2. Description of the Related Art

A directory is a hierarchical arrangement of information pertaining to objects, such as users, groups, and systems in an organization. A directory server is a server in a data processing environment that provides a directory service. A directory service is a process by which a user in the data processing environment can retrieve details of an object from a directory server by providing a name of the object.

Directory servers may serve directories that are arranged according to some standard. Standards, such as Lightweight Directory Access Protocol (LDAP), specify ways of accessing the information stored in a directory, the operations allowed on the information in the directory, and how those operations are to be executed with respect to the directory. A directory may be implemented using a standard, a variation of the standard, or by using a proprietary hierarchy. For example, the illustrative embodiments may be implemented using an X.500 directory server, which implements a directory standard of that name. The illustrative embodiments may also be implemented using a name server, or a user location service server (ULS server).

Information pertaining to an object, such as a user or a system, in a directory is called an entry. Typically, an entry includes a name and a set of attributes. An attribute of an entry is a data component of the entry. An attribute may itself have a value, or an attribute may be a data structure that may include one or more tags, each tag having a value. A tag is a data component of an attribute. Entries in a directory may be modified from time to time. Furthermore, entries in a directory may relate to and reference other entries. Certain data stored in a directory may include references to a set of entries in the directory. A set of entries is one or more entries. Frequently, such as during directory maintenance, an entry may have to be modified or deleted.

SUMMARY OF THE INVENTION

The illustrative embodiments provide a method, system, and computer usable program product for preserving references to deleted directory entries. An instruction to delete the entry is received. A second entry that includes a reference to the entry is identified. The second entry is marked as a ghost reference to the entry such that the information about the entry is preserved in the second entry. The entry is processed according to a conversion process to convert the entry to a deleted entry.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a flowchart of a process of preserving a ghost reference to a deleted directory entry in accordance with an illustrative embodiment;

FIG. 7 depicts a flowchart of a process of configuring and manipulating a reference in order to preserve the reference to an entry being deleted in a directory according to an illustrative embodiment.

DETAILED DESCRIPTION OF THE PREFERRED EMBODIMENT

Figure 1:
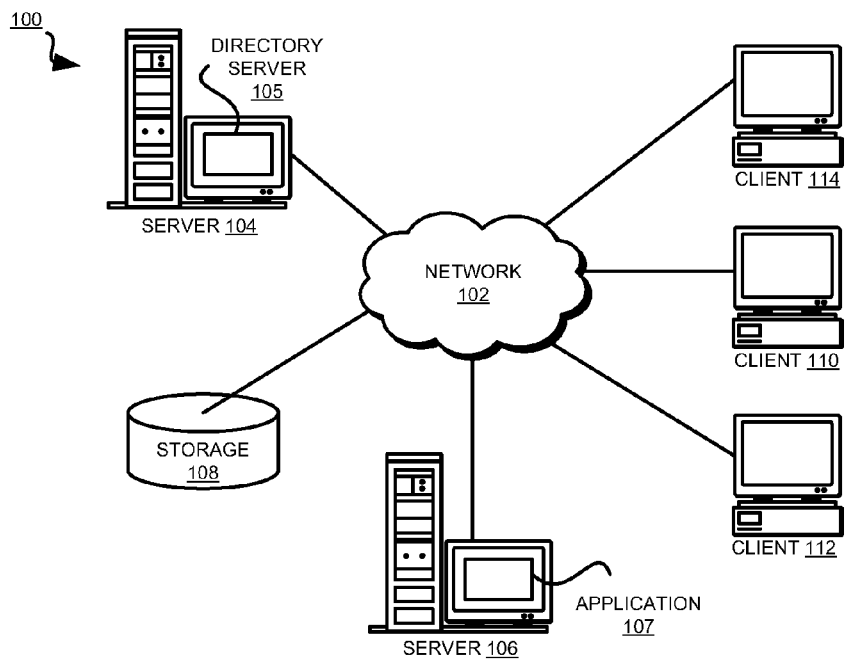
FIG. 1 depicts a pictorial representation of a network of data processing systems in which illustrative embodiments may be implemented.

Presently available directory servers manage deleted entries through a change log, a tombstone directory, or both. A change log is a log file of changes that are made to the directory served by the directory server. A tombstone directory is a directory separate from the main directory of the directory server, and contains those entries that are deleted from the main directory.

The illustrative embodiments recognize that a change log stores just the delete request but not the details of the deleted entry. For example, a log in the change log may contain the date and time of a delete operation, an identifier of the entry being deleted, and an identifier of a user or system requesting or performing the delete operation. An identifier of an entry is a name, keyword, code, or some alphanumeric text that can be used to locate an entry in a directory.

The illustrative embodiments further recognize that a tombstone directory stores the attributes associated with the deleted entry but not any references to the entry that were deleted or disrupted when the entry was deleted. An attribute of an entry is data that is a part of the entry. An entry in a directory can be configured to have a set of attributes. A set of attributes is one or more attributes. Furthermore, different entries in a given directory may include different sets of attributes.

A reference to a first entry is information associated with a second entry that relates the second entry to the first entry. In other words, the second entry is said to reference the first entry by using that information. For example, a directory may maintain an access control list (ACL). An access control list is a list of entries and their corresponding access privileges to certain resources in a data processing environment.

As an example, an implementation of access control list in a directory may reference an entry stored elsewhere in the directory, such as the directory subtree where all the object entries may be stored, and store the access privileges of the entry being referenced. Thus, the example access control list in such an implementation may include a list of references to entries correlated with a list of access privileges.

Other examples of data in a directory that may use references to entries in the directory include group memberships, seeAlso lists, and aliases. Group membership information in a directory may correlate a reference to an entry in the directory to a list of groups to which the user or system identified in the entry may belong.

SeeAlso lists may include information that when accessed by a user or system may point to other entries in the directory that may also be relevant to the user or system. Generally, the seeAlso list may point to such entries by a reference to those entries.

An alias list in a directory may correlate an alias to an entry in the directory that may be used or found using that alias. The alias list may correlate the alias to the entry by a reference to the entry.

The illustrative embodiments recognize that access control lists, group memberships, seeAlso lists, and aliases are only some examples of information in a directory that use references to entries in the directory. The illustrative embodiments recognize that many other data structures, data hierarchies, data organizations, or pieces of information in a directory may relate to entries in the directory by reference.

The illustrative embodiments further recognize that, presently, when an entry is deleted in a directory, the references to the entry are also deleted. In other words, if an entry associated with a user "Joe Q. Public" is deleted from the directory, any groups that Joe belonged to, access privileges that Joe had, or aliases that Joe used are also deleted.

The illustrative embodiments recognize that deleting the references associated with the deleted entries causes several problems. As an example, a directory administrator may want to restore a deleted entry, that may have been deleted by mistake, or the user may have been reinstated, or for some other reason. Having deleted the references with the user's entry, the administrator has no way of knowing to which groups the user used to belong, or to which resources the user had access previously.

As another example, the illustrative embodiments recognize that deleting the references may create gaps in the knowledge gathering in the future. After a user's entry and any references there to have been deleted from a directory, an attempt to identify what type of access and to which resource the deleted user may have had will be unsuccessful.

A practical use of such information is in audit trails. Deleting entries with their references will cause gaps to arise in an audit report. For example, if a security breach occurs in a data processing environment, an audit may need to document which users—present and past—had access to a particular computing resource, such as a file. If the references to past users are also deleted when the past user left the organization, as is presently done, an auditor will not be able to construct a complete audit report for the past users whose entries and references have been deleted from the directory.

To address these and other problems associated with deleting entries and references in the present directories, the illustrative embodiments provide a method, computer usable program product, and data processing system for preserving references to deleted directory entries. Using the illustrative embodiments, deleted entries can be fully restored, together with any associations, relations, or participation they may have had in other information stored in the directory. Using the illustrative embodiments, a user can trace detailed relationships of deleted entries, such as the activities, participation, or involvement of users associated with deleted entries.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

The illustrative embodiments are described using specific code, data structures, designs, layouts, schematics, and tools only as examples and are not limiting on the illustrative embodiments. For example, some illustrative embodiments set or reset the value of an attribute, but the illustrative embodiments may be implemented to set or reset a value of an attribute, or the value of a tag of an attribute within the scope of the illustrative embodiment.

The illustrative embodiments may be implemented with respect to any type of directory entry and any type of reference within a directory. Furthermore, the illustrative embodiments are described in some instances using particular software tools and data processing environments only as an example for the clarity of the description. The illustrative embodiments may be used in conjunction with other comparable or similarly purposed systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
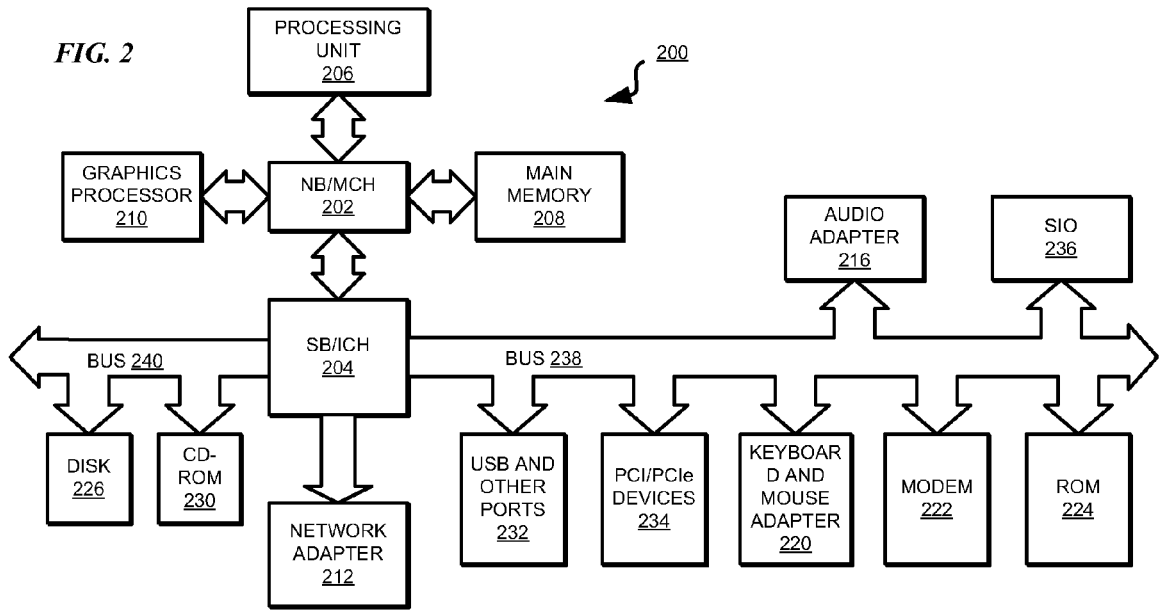
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may have software applications or software tools executing thereon. For example, server 104 may include directory server 105. Server 106 may include software tools that interact with directory server 105 or components of directory server 105, such as application 107.

Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
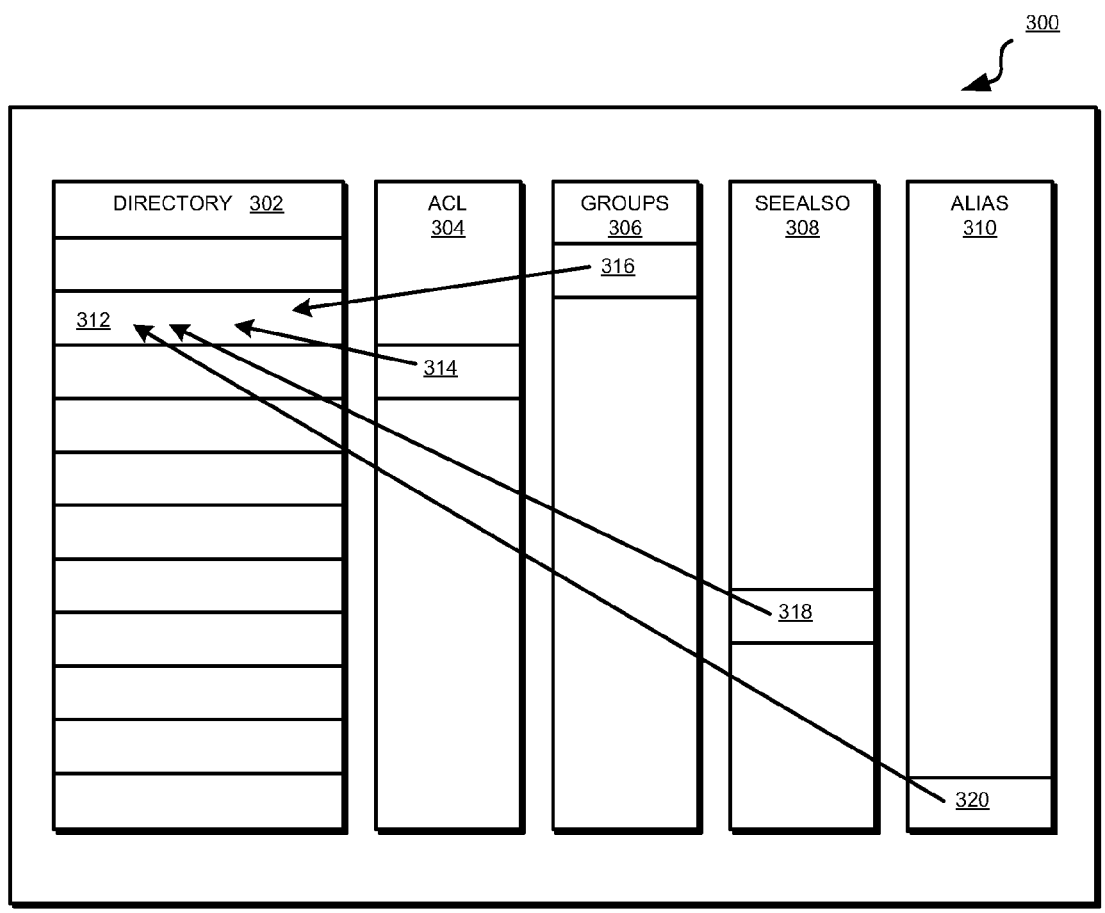
FIG. 3 depicts a block diagram of a directory in conjunction with which an illustrative embodiment may be used.

With reference to FIG. 3, this figure depicts a block diagram of a directory in conjunction with which an illustrative embodiment may be used. Directory server 300 may be implemented using directory server 105 in FIG. 1.

Directory server 300 may include directory 302. Directory server 300 may further serve or otherwise include additional data structures, for example, ACL 304, Groups list 306, See-Also list 308, and Alias list 310. Any of these and other data structures may include references to entries in one another, directory 302, or data located elsewhere in directory server 300.

For example, directory 300 may include a set of entries. Entry 312 may be an example entry in the set of entries. ACL 304 may include a reference to one or more entries in directory 302. For example, reference 314 may be a reference in ACL 304 to entry 312 in directory 302. Groups list 306 may include a reference to one or more entries in directory 302. For example, reference 316 may be a reference in groups list 306 to entry 312 in directory 302.

SeeAlso list 308 may include a reference to one or more entries in directory 302. For example, reference 318 may be a reference in seeAlso list 308 to entry 312 in directory 302. Alias list 310 may include a reference to one or more entries in directory 302. For example, reference 320 may be a reference in alias list 310 to entry 312 in directory 302.

Figures 4, 5:
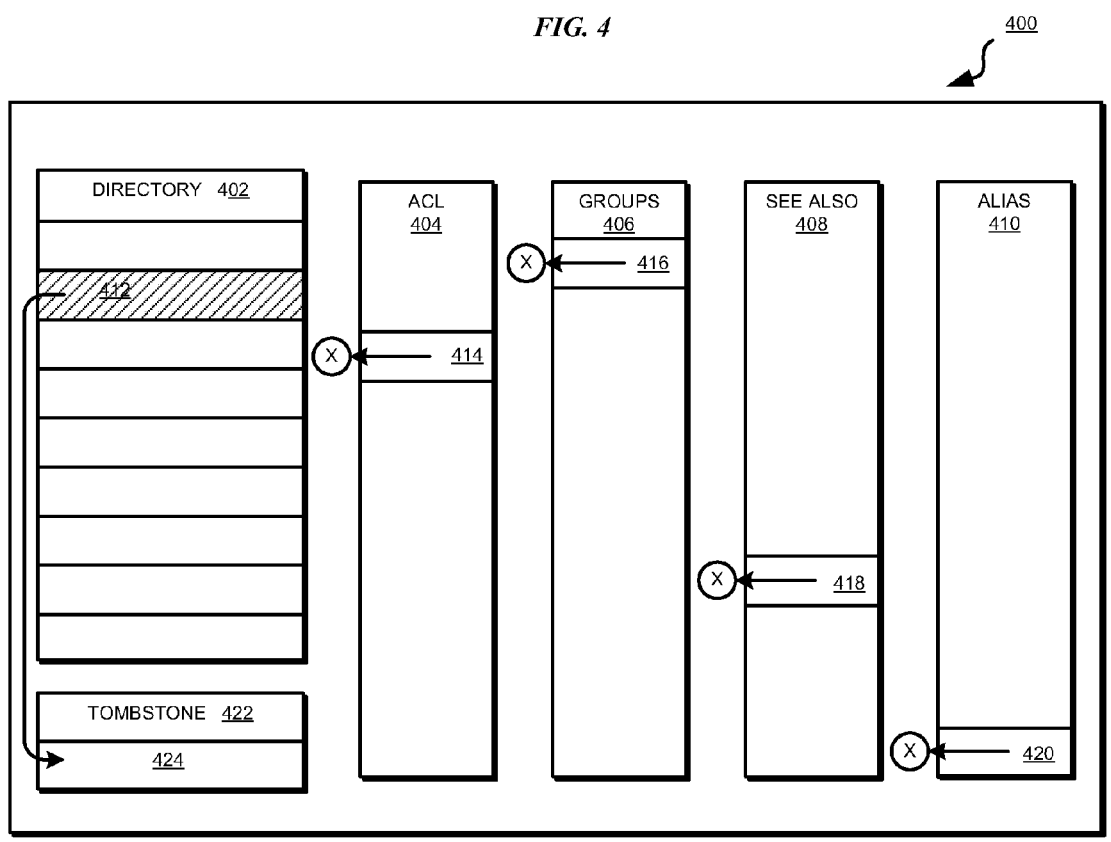
FIG. 4 depicts a block diagram of a delete operation in a directory with respect to which an illustrative embodiment may be implemented.
FIG. 5 depicts a block diagram of an entry including a ghost attribute in accordance with an illustrative embodiment.

With reference to FIG. 4, this figure depicts a block diagram of a delete operation in a directory with respect to which an illustrative embodiment may be implemented. Directory server 400 may be similar to directory server 300 in FIG. 3.

Directory 402, ACL 404, groups list 406, seeAlso list 408, and alias list 410 may be similar to the corresponding components in FIG. 3. Entry 412 may be similar to entry 312 in FIG. 3. References 414, 416, 418, and 420 may be references to entry 412 in a manner similar to the corresponding references in FIG. 3.

Tombstone directory 422 may be a directory or another data storage in directory server 400 where deleted entries may be stored. As an example, entry 424 in tombstone directory 422 may be entry 412 when entry 412 is deleted from directory 402. Upon such deletion of entry 412, references 414, 416, 418, and 420 are also deleted. However, presently, neither of references 414, 416, 418, or 420 is stored in tombstone directory 422 or elsewhere in directory server 400.

Presently, when an entry is deleted along with the references, the entry can be restored with the references only by one of two ways. First, an administrator has to reestablish all the references anew upon restoring the deleted entry from the tombstone directory. This process is time consuming, and in some cases may be prone to accidental omission of references that previously existed, or accidental inclusion of references that previously did not.

Second, an administrator can use an older copy of the directory, such as a directory backup file, where the entry and its references had not yet been deleted to restore the directory. However, in so restoring from an old backup, all the intermediate changes to the directory are lost.

A ghost entry is an entry in a directory that acts as a placeholder for an actual entry that has been removed from the directory. A ghost entry may or may not include the information of the actual entry. For example, a ghost entry may be left in directory 402 in place of deleted entry 412 such that references 414, 416, 418, or 420 may validly point to entry 412, albeit entry 412 may be a ghost entry.

However, as the illustrative embodiments recognize, only inserting ghost entries for deleted entries, such as the one described with respect to entry 412, leads to a different problem. For example, a user analyzing groups list 406 will not be able to distinguish without significant additional effort whether an entry in groups list 406 is referencing a real entry or a ghost entry in directory 402.

The illustrative embodiments describe a way of including ghost attributes, instead of or in conjunction with ghost entries, in the data structures of a given directory. Similar to an attribute, a ghost attribute of an entry is data that is a part of the entry. A ghost attribute, when set to a "true" or an equivalent value indicates that the associated entry is a ghost entry. Conversely, a ghost attribute with a "false" or an equivalent value indicates that the entry is not a ghost entry, to with, the entry is a valid entry.

Any entry in any data structure of a directory server can be modified to include a ghost attribute according to the illustrative embodiments. Only as examples, and without limiting the scope of the illustrative embodiments, some illustrative embodiments herein describe the use of ghost attributes for preserving references to deleted directory entries.

With reference to FIG. 5, this figure depicts a block diagram of an entry including a ghost attribute in accordance with an illustrative embodiment. Entry 500 may be an entry in any data structure in a directory server, such as any of references 414, 416, 418, or 420, or entry 412 in FIG. 4.

In order to describe the illustrative embodiment of this figure, assume that an entry, such as entry 412 in FIG. 4, exists in a directory, such as directory 402 in FIG. 4. Assume the example entry to include several attributes including an attribute labeled "cn" denoting "Common Name" and have a value "Joe". Another attribute of the example entry may be labeled "o" denoting "Organization" and have a value "IBM". Another attribute of the example entry may be labeled "c" denoting "Country" and have a value "US". The example entry may include any number of additional attributes. Collectively, the "cn" "o", "c", and other similar attributes make up a "distinguished name" of an entry. An entry can be uniquely identified using the entry's distinguished name.

Further assume that an entry referring to the example entry, such as reference 416 in FIG. 4, exists in another data structure, such as groups list 406 in FIG. 4. Such a reference entry may also include the "cn", "o", and "c" attributes and their values corresponding to the actual entry to which it refers. In one embodiment, distinguished name attributes such as "cn", "o", "c", or other similar attributes may not be separate attributes in a reference entry, but may be tags with respective values in an attribute without departing from the scope of the illustrative embodiments. Entry 500 in this figure is modified according to an illustrative embodiment to preserve the reference to the actual entry in the reference entry when the actual entry is deleted.

Continuing with the example, entry 500 may be similar to reference 416 in FIG. 4, representing a an entry, for example, in a group called "member". Entry 500 may include ghost attribute 502, "cn" attribute 504, "o" attribute 506, "c" attribute 508, and any number of additional attributes. Attributes 504, 506, and 508 are shown to have values that correspond to the values of corresponding attributes in the actual entry of this example.

"Ghost" attribute 502 in entry 500 is an additional attribute according to the illustrative embodiment. When the actual entry is deleted, instead of deleting entry 500, which refers to the actual entry, the illustrative embodiment sets the value of ghost attribute 502 to "true". Entry 500 is then left intact in the data structure where it previously existed. Thus, in response to an instruction to delete an entry, the illustrative embodiments do not delete the entry but employ a conversion process. The conversion process coverts the entry to a ghost entry instead of actually removing the entry such that for the purposes of the operations of the directory, the entry can be considered as deleted.

For example, reference 416 in FIG. 4 may include a ghost attribute similar to ghost attribute 502, and that ghost attribute may be set to "True" when corresponding entry 412 in FIG. 4 is deleted, modified reference 416 continuing to occupy its place in groups list 406 in FIG. 4. Any referential entry in any data structure in a given directory may be modified in this manner according to the illustrative embodiment.

In one embodiment, entry 500 may take the form of an attribute with several tags. In such an embodiment, the various values in entry 500 may be the values of various tags in an attribute of an entry. For example, entry 500 may be an attribute in a group entry called "member" in a groups list. In such an embodiment, entry 500 in attribute form may include a distinguished name. The distinguished name may include the values shown as attributes 504, 506, 508 and other attributes as tag-value pairs. The attribute form of entry 500 may thus refer to a user's entry, such as entry 412 in FIG. 4, as a part of a member entry in a groups list. The member entry may include many such attributes, each attribute referencing an object entry in the directory.

In such an embodiment, where entry 500 takes an attribute form, ghost attribute may also take the form of a tag in that attribute, and may not be a separate attribute. Setting the ghost tag to true may make entry 500 in attribute form a ghost attribute. Thus, in response to deleting an attribute, the illustrative embodiments employ a conversion process on the attribute instead of deleting the attribute. The conversion process converts the attribute to a ghost attribute instead of actually removing the attribute from the entry such that for the purposes of the operations of the directory, the attribute can be considered as deleted.

With reference to FIG. 6, this figure depicts a flowchart of a process of preserving a ghost reference to a deleted directory entry in accordance with an illustrative embodiment. Process 600 may be implemented in a directory server, such as directory server 105 in FIG. 1. Process 600 may also be implemented in a software application that may interact with a directory server, for example, in application 107 in FIG. 1.

Process 600 begins by receiving an instruction to delete an entry in a directory (step 602). Process 600 may replace the entry to be deleted with a ghost entry (step 604). Step 604 may be included or omitted in process 600 without departing from the scope of the illustrative embodiments. For example, an embodiment of process 600 may delete the entry completely. Another embodiment of process 600 may delete the entry and replace the entry with a ghost entry within the scope of the illustrative embodiments.

Process 600 identifies a reference to the deleted or about to be deleted entry (step 606). Process 600 marks the reference identified in step 606 as a ghost reference (step 608). For example, in one embodiment, where the reference may be an entry with attributes, process 600 may set a "ghost" attribute of the reference to "true" according to the illustrative embodiments. In another embodiment, where the reference may be an attribute with tag-value pairs, process 600 may mark the reference attribute with a "ghost=true" tag according to the illustrative embodiments.

Process 600 moves or copies the entry to be deleted to a tombstone directory (step 610). Process 600 ends thereafter.

With reference to FIG. 7, this figure depicts a flowchart of a process of configuring and manipulating a reference in order to preserve the reference to an entry being deleted in a directory according to an illustrative embodiment. Process 700 may be implemented in a directory server, such as directory server 105 in FIG. 1. Process 700 may also be implemented in a software application that may interact with a directory server, for example, in application 107 in FIG. 1.

Process 700 may be used to pre-configure a directory for using the illustrative embodiments. Process 700 begins by adding a ghost attribute to a set of reference entries in a directory (step 702). Process 700 may reset the value of the ghost attributes thus added to "False" at the time of adding the ghost attributes. In one embodiment, process 700 may add a ghost tag to a reference attribute. Although process 700 is described with respect to a ghost attribute, process 700 is equally usable where ghost tags are used instead of ghost attributes. For example, process 700 may add a ghost tag to a set of reference attributes and resetting the ghost tags to "False" within the scope of the illustrative embodiments. Other steps of process 700 may also be performed in a similar manner with respect to ghost tags.

Process 700 determines whether an entry is being deleted from the directory (step 704). If process 700 determines that an entry is not being deleted from the directory ("NO" path of step 704), process 700 ends thereafter.

If, however, process 700 determines that an entry is being deleted from the directory, ("YES" path of step 704), process 700 sets to "true" the ghost attribute of one or more reference entries referencing the entry that is being deleted (step 706). Process 700 ends thereafter.

Figure 8:
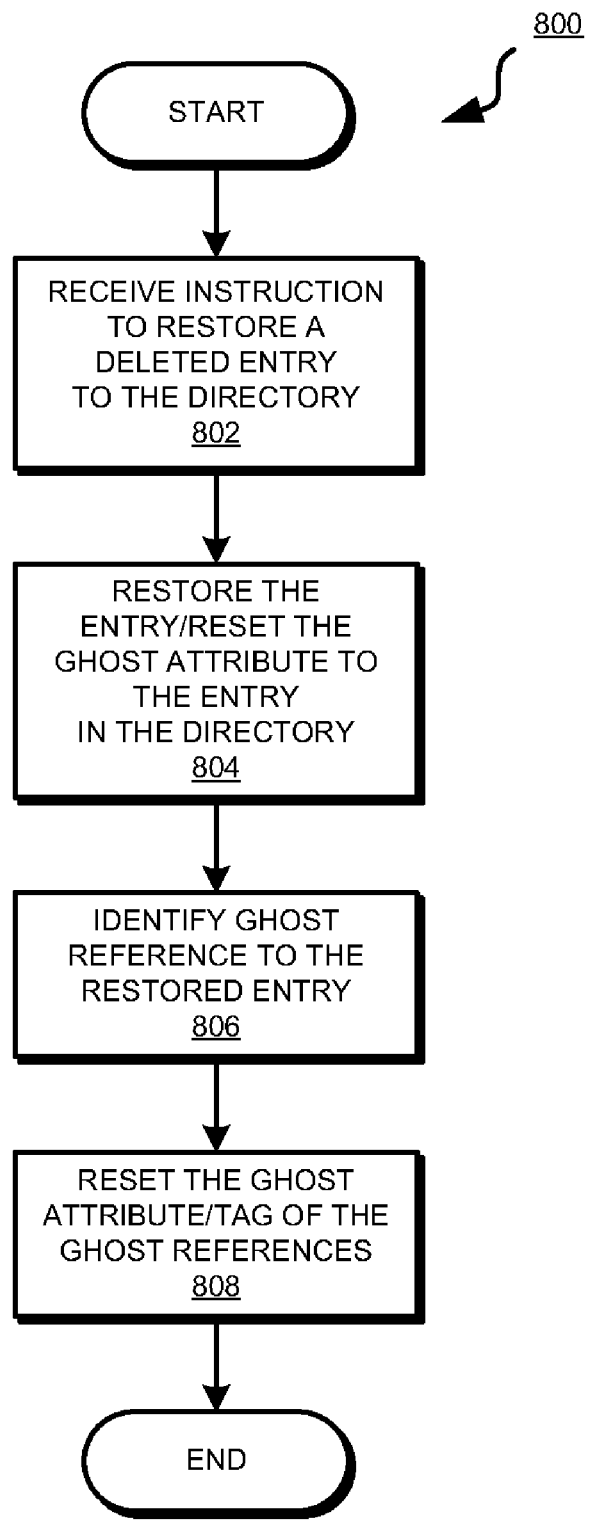
FIG. 8 depicts a flowchart of a process of restoring a deleted entry and a reference to the deleted entry in accordance with an illustrative embodiment.

With reference to FIG. 8, this figure depicts a flowchart of a process of restoring a deleted entry and a reference to the deleted entry in accordance with an illustrative embodiment. Process 800 may be implemented in a directory server, such as directory server 105 in FIG. 1. Process 800 may also be implemented in a software application that may interact with a directory server, for example, in application 107 in FIG. 1.

Process 800 begins by receiving an instruction to restore a deleted entry of a directory to the directory (step 802). Process 800 restores the entry to the directory (step 804). In one embodiment of process 800, process 800 may copy the attributes of the deleted entry from the tombstone directory to the appropriate location of the entry. In another embodiment, if the entry used the ghost attribute of the illustrative embodiments, process 800 may reset the ghost attribute of the deleted entry to restore the entry's status as an actual entry.

Process 800 identifies a ghost reference to the restored entry (step 806). For example, process 800 may search for certain attributes of the restored entry in other data structures in the directory server to locate references to the restored entry. Process 800 may execute step 806 any number of times to identify any number of references to the restored entry.

Process 800 may reset the ghost attributes of the identified one or more references to the restored entry (step 808). Process 800 ends thereafter.

Process 800 is described with respect to ghost attributes only as an example. Process 800 is equally usable where ghost tags are used instead of or in combination with ghost attributes. For example, in one embodiment, where ghost attribute is implemented as a ghost tag, process 800 may reset the ghost tag in step 808. In another embodiment, where ghost attributes and ghost tags are both used in combination, process 800 may reset ghost attributes and ghost tags as needed. In another embodiment, process 800 may remove a ghost attribute or ghost tag instead of resetting in step 808 within the scope of the illustrative embodiments.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for preserving references to deleted directory entries. By implementing the illustrative embodiments, a user may be able to search a directory such that reference attributes marked as ghosts are ignored in the search results. Searching in this manner, the user will be able to receive a search result that is identical in content as with the presently used directory without the ghost references of the illustrative embodiments. As a benefit of the illustrative embodiments, the user may also be able to review the references that are now ghost references to deleted entries, a review not possible in the present configuration of directories.

Furthermore, as another benefit of the illustrative embodiments, if the user desires to restore a deleted entry, the user can send a control to the directory to reset or remove the ghost attribute or tag from the reference entry or attribute corresponding to the deleted entry being restored. The user may reset some or all of the ghost references to restore the deleted entry and its references, participation, and memberships in a configurable manner.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for preserving a reference to an entry in a directory, the computer implemented method comprising:
    receiving an instruction to delete the entry from the directory, the directory being served from a directory server according to a Directory Access Protocol, the directory server executing in a data processing system using a processor and a memory;
    identifying a second entry that includes a reference to the entry;
    marking the second entry as a ghost reference to the entry such that the ghost reference preserves information about the entry in the second entry; and
    responsive to the instruction, processing the entry according to a conversion process to convert the entry to a deleted entry.

2. The computer implemented method of claim 1, wherein processing the entry according to the conversion process comprises:
    converting the entry to a ghost entry by setting a value of a ghost attribute in the entry to true.

3. The computer implemented method of claim 1, further comprising:
    adding a ghost attribute to one of (i) the entry, (ii) the second entry; and
    setting a value of the ghost attribute to false.

4. The computer implemented method of claim 3, wherein the reference to the entry is an attribute of the second entry, wherein the ghost attribute of the second entry is a tag of the attribute corresponding to the reference to the entry, and wherein setting the value includes setting a value of the ghost tag to false.

5. The computer implemented method of claim 1, wherein marking the second entry as the ghost reference comprises:
    setting a value of a ghost tag in the second entry to true.

6. The computer implemented method of claim 1, further comprising:
    receiving an instruction to restore the entry;
    restoring the entry to the directory;
    identifying a ghost reference to the entry; and
    restoring the ghost reference to the second entry.

7. The computer implemented method of claim 6, wherein restoring the entry to the directory comprises:
    setting a value of a ghost attribute in the entry to false.

8. The computer implemented method of claim 6, wherein restoring the ghost reference to the second entry comprises removing a ghost tag in the ghost reference.

9. The computer implemented method of claim 1, wherein the second entry is a valid reference to the entry, and the ghost reference is a preserved reference to the entry when the entry is deleted.

10. A computer usable program product comprising a computer usable storage device including computer usable code for preserving a reference to an entry in a directory, the computer usable code when executed causing a data processing system to perform actions, the actions comprising:
   receiving an instruction to delete the entry from the directory,
   the directory being served from a directory server according to a Directory Access Protocol,
   the directory server executing in a data processing system using a processor and a memory;
   identifying a second entry that includes a reference to the entry;
   marking the second entry as a ghost reference to the entry, wherein the second entry is a valid reference to the entry, and the ghost reference preserves information about the entry in the second entry; and
   responsive to the instruction, processing the entry according to a conversion process to convert the entry to a deleted entry.

11. The computer usable program product of claim 10, wherein deleting the entry comprises converting the entry to a ghost entry by setting a value of a ghost attribute in the entry to true, and wherein marking the second entry as the ghost reference comprises setting a value of a ghost tag in the second entry to true.

12. The computer usable program product of claim 10, the actions further comprising:
   adding a ghost tag to the second entry and setting a value of the ghost tag to false.

13. The computer usable program product of claim 10, the actions further comprising:
   receiving an instruction to restore the entry;
   restoring the entry to the directory;
   identifying a ghost reference to the entry; and
   restoring the ghost reference to the second entry wherein restoring the ghost reference to the second entry comprises removing a ghost tag in the ghost reference.

14. The computer program product of claim 10, wherein the computer usable code is stored in a computer readable storage medium in a data processing system, and wherein the computer usable code is transferred over a network from a remote data processing system.

15. The computer program product of claim 10, wherein the computer usable code is stored in a computer readable storage medium in a server data processing system, and wherein the computer usable code is downloaded over a network to a remote data processing system for use in a computer readable storage medium associated with the remote data processing system.

16. A data processing system for preserving a reference to an entry in a directory, the data processing system comprising:
   a storage device including a storage medium, wherein the storage device stores computer usable program code; and
   a processor, wherein the processor executes the computer usable program code, and wherein the computer usable program code when executed causes the data processing system to perform actions, the actions comprising:
   receiving an instruction to delete the entry from the directory, the directory being served from a directory server according to a Directory Access Protocol;
   identifying a second entry that includes a reference to the entry;
   marking the second entry as a ghost reference to the entry, wherein the second entry is a valid reference to the entry, and the such that the ghost reference preserves information about the entry in the second entry; and
   responsive to the instruction, processing the entry according to a conversion process to convert the entry to a deleted entry.

17. The data processing system of claim 16, wherein deleting the entry comprises: converting the entry to a ghost entry by setting a value of a ghost attribute in the entry to true.

18. The data processing system of claim 16, the actions further comprising:
   adding a ghost tag to the second entry and setting a value of the ghost tag to false.

19. The data processing system of claim 16, wherein marking the second entry as the ghost reference comprises:
   setting a value of a ghost tag in the second entry to true.

20. The data processing system of claim 16, the actions further comprising:
   receiving an instruction to restore the entry;
   restoring the entry to the directory;
   identifying a ghost reference to the entry; and
   restoring the ghost reference to the second entry wherein restoring the ghost reference to the second entry comprises removing a ghost tag in the ghost reference.

* * * * *